(12) United States Patent
Luu

(10) Patent No.: US 12,293,682 B1
(45) Date of Patent: May 6, 2025

(54) DISPLAY PANEL

(71) Applicant: Brand Assets Protection LLC, Houston, TX (US)

(72) Inventor: Quan Luu, Houston, TX (US)

(*) Notice: Subject to any disclaimer, the term of this patent is extended or adjusted under 35 U.S.C. 154(b) by 0 days.

(21) Appl. No.: 18/669,025

(22) Filed: May 20, 2024

(51) Int. Cl.
| G09F 7/18 | (2006.01) |
| B32B 3/28 | (2006.01) |
| B32B 7/023 | (2019.01) |
| B32B 27/08 | (2006.01) |
| B32B 27/20 | (2006.01) |
| B32B 27/32 | (2006.01) |
| G09F 7/00 | (2006.01) |

(52) U.S. Cl.
CPC ............... *G09F 7/002* (2013.01); *B32B 3/28* (2013.01); *B32B 7/023* (2019.01); *B32B 27/08* (2013.01); *B32B 27/20* (2013.01); *B32B 27/32* (2013.01); *G09F 7/18* (2013.01); *B32B 2250/03* (2013.01); *B32B 2250/40* (2013.01); *B32B 2255/10* (2013.01); *B32B 2264/1022* (2020.08); *B32B 2272/00* (2013.01); *B32B 2307/4026* (2013.01); *B32B 2307/72* (2013.01); *G09F 2007/1856* (2013.01)

(58) Field of Classification Search
CPC .... G09F 7/002; G09F 7/18; G09F 2007/1856; B32B 7/023; B32B 3/28; B32B 27/08; B32B 27/20; B32B 27/32; B32B 2264/1002; B32B 2250/03; B32B 2250/40; B32B 2255/10; B32B 2272/00; B32B 2307/4026; B32B 2307/72
See application file for complete search history.

(56) References Cited

U.S. PATENT DOCUMENTS

| 3,958,351 | A | | 5/1976 | Summey | |
| 4,658,527 | A | * | 4/1987 | Pingel | G09F 7/22 40/607.01 |
| 4,885,860 | A | | 12/1989 | Huenefeld | |
| 4,894,937 | A | * | 1/1990 | Davis | G09F 7/18 248/248 |
| 5,042,183 | A | * | 8/1991 | Kennedy | G09F 7/18 248/156 |
| 5,230,176 | A | | 7/1993 | Schomaker | |
| 5,937,555 | A | | 8/1999 | Query | |

(Continued)

FOREIGN PATENT DOCUMENTS

| JP | 2002052635 A | 2/2002 |
| JP | 4478131 B2 | 6/2010 |
| KR | 100975600 B1 | 8/2010 |

OTHER PUBLICATIONS

"Fillplas," https://fillplas.com/white-masterbatch-cost-effective-option-for-white-articles/ (Year: 2018).*

*Primary Examiner* — Gary C Hoge

(74) *Attorney, Agent, or Firm* — Egbert, McDaniel & Swartz, PLLC

(57) ABSTRACT

A display panel has an inner layer formed of a plurality of flutes, a first outer layer affixed to one side of the inner layer so as to overlie the plurality of flutes, and a second outer layer affixed to an opposite side of the inner layer. The second outer layer also overlies the plurality of flutes. The inner layer and the outer layers are co-extruded together. The plurality of flutes are of a black color. Each of the outer layers is of white color.

13 Claims, 4 Drawing Sheets

(56) References Cited

U.S. PATENT DOCUMENTS

| | | | | |
|---|---|---|---|---|
| 6,170,183 | B1* | 1/2001 | Keefe | G09F 15/0006 |
| | | | | 248/156 |
| 7,150,119 | B1* | 12/2006 | Nudo, Jr. | G09F 15/02 |
| | | | | 428/138 |
| 7,437,844 | B1* | 10/2008 | Kennedy | G09F 15/00 |
| | | | | 40/607.05 |
| 7,743,539 | B1* | 6/2010 | Kennedy | G09F 15/0062 |
| | | | | 40/607.01 |
| 8,677,663 | B1 | 3/2014 | Tyszko | |
| 9,208,706 | B1 | 12/2015 | Baron | |
| 10,679,526 | B1* | 6/2020 | Ritter, Jr. | G09F 7/002 |
| 11,501,666 | B1 | 11/2022 | Marston | |
| 12,080,194 | B1* | 9/2024 | Drummond | G09F 3/02 |
| 2003/0019988 | A1* | 1/2003 | Barber | G09F 7/18 |
| | | | | 248/302 |
| 2005/0039363 | A1 | 2/2005 | Galey | |
| 2006/0010738 | A1* | 1/2006 | Roark | G09F 15/0056 |
| | | | | 40/479 |
| 2006/0222822 | A1* | 10/2006 | Bringuet | B32B 3/08 |
| | | | | 428/188 |
| 2007/0094906 | A1* | 5/2007 | Milligan | G09F 15/00 |
| | | | | 40/604 |
| 2009/0013575 | A1* | 1/2009 | Berteau | G09F 7/22 |
| | | | | 40/606.01 |
| 2014/0345176 | A1 | 11/2014 | Okert | |
| 2015/0007471 | A1* | 1/2015 | Cepek | G09F 7/22 |
| | | | | 40/607.03 |
| 2016/0303834 | A1* | 10/2016 | Kato | B32B 27/32 |
| 2021/0156534 | A1* | 5/2021 | Weddendorf | G09F 13/02 |
| 2022/0262278 | A1* | 8/2022 | Stockley | G09F 19/22 |

\* cited by examiner

DISPLAY PANEL

BACKGROUND OF THE INVENTION

The present invention relates to display panels. More particularly, the present invention relates to the display panels in the nature of yard signs in which information is displayed on a surface of the sign. The present invention also relates to display panels wherein a plurality of flutes are interposed between outer layers of the display panel.

Signs take on many representations and uses. Some are permanent and others are temporary. Usually the goal of the sign is to elicit a response from a viewer or to simply inform the viewer of the sign with the message printed thereon. Commercial signage is in a form of advertising which attempts to inform a passerby of a business or product that may be of interest. In these cases, the sign functions as a notice or invitation by seller that the seller has merchandise for sale and for a potential purchaser to view the merchandise. The sign can be remote from the business or can be positioned at the seller's place of business. In some cases, when the object to be sold is inconvenient or unable to be relocated to the site of the business, the signage is positioned at the site where the object to be sold is located. One such case of placing outdoor signage is for advertising parcels of commercial and/or residential real estate that are for sale.

Real estate agents, in particular, rely heavily on outdoor advertising to promote the sale of commercial and residential properties. One outdoor advertising display commonly used in the real estate industry is a corrugated cardboard sign that includes a metal support structure shaped as an uppercase letter "H". The lower legs of the H-shaped display are pushed into the ground on or near the property being advertised and the upper legs of the H-shaped display are used to support the corrugated sign.

Outdoor sign displays are visible in virtually every business open to customers. Generally, the outdoor signs are constructed of a sign structure or framework fabricated from angle iron, sheet-metal and a mounting pole. The sign structure is configured to correspond to and support the periphery of a sign panel which, in turn, supports a preselected sign display. The interior of the sign structure can include a light source that uniformly illuminates the sign panel. The material used to fabricate the sign panel is generally plastic that is sufficiently strong to support the sign and display and to withstand inclement weather. Further, the sign panel material is generally opaque or milky white in color to obscure or hide the outline of a light source inside the sign structure.

The original yard signs were basically printed cardboard supported by wooden stakes. More recently, yard signs printed on flexible plastic film have been used. Such yard signs are supported by a U-shaped wire frame or wicket which is forced into the ground and the yard sign, which is in the configuration of a plastic sleeve, is placed over the wire wicket, thereby holding it in place. The yard sign is generally printed on both sides so that it can be viewed from two different directions. However, plastic can be relatively translucent. Thus, if a single layer of plastic is employed as a yard sign, the sunlight will cause the printing on one side to be viewable from the opposite side. This makes the yard sign relatively unattractive and difficult to read.

Traditionally, yard signs consisted of cardboard prints mounted on wooden stakes. A more modern approach uses flexible plastic films that are supported by a U-shaped wire frame. This U-shaped wire frame is commonly known as a wicket. This wicket is anchored into the ground. These plastic signs are designed as sleeves so as to slide over the wire wickets in order to stay in position. These yard signs are designed for visibility from multiple directions. As such, the yard signs are typically printed on both sides. The inherent translucency of plastic presents a problem. Sunlight penetrating a single plastic layer can make the print on the reverse side visible from the front. This compromises the visual appeal and readability of the sign.

FIG. 1 illustrates a traditional yard sign 10. This design relies on a single, translucent plastic layer 12 for the display of information. Legs 16 and 18 of the H-shaped frame 14 (along with cross-member 20) provide support to the yard sign 10. This type of construction leads to significant visibility issues. The present invention is intended to solve these visibility issues.

The translucent nature of traditional signs causes a major problem. For example, directional cues met for one side (i.e. arrow 26) can bleed through so as to interfere with the message on the opposite side of the sign (i.e. arrow 28 and the word "PARKING"). This can be worsened by the visible H-frame within the flutes under direct sunlight. The resulting visual confusion poses a risk for drivers. This can lead to misinterpretation and accidents.

A need has developed so as to address this critical need for light-blocking technology. It is important to be able to ensure that information on one side of a sign remains clear and unambiguous, even in harsh sunlight. Also, such signs should have the necessary structural integrity for reliable outdoor use. The display signed the present invention is intended to address these particular issues and solve these problems.

In the past, various patents and publications have issued with respect to such signage. For example, U.S. Pat. No. 3,958,351, issued on May 25, 1976, describes a modular sign support assembly. Duplicate units of the sign support assembly may be integrated to form a sign support structure that supports one or more signs in a number of configurations or orientations. Each sign support assembly includes a base support member that is adapted to be secured adjacent an upright pole and further includes a cantilever beam having a sign mounting frame structure secured thereto and adapted to receive and support at least one sign.

U.S. Pat. No. 4,885,860, issued on Dec. 12, 1989 to R. C. Huenefeld, teaches a yard sign having a pair of display panels. Each of the display panels has a panel-shaped configuration and is adapted to nest one within the other so that the cavity is formed therebetween. An H-shaped support frame is positioned within the nested panels with only that portion of the legs that extend below the crossbar being located exteriorly of the display panels. The top edges of the legs of the H-shaped frame abut the nested display panel's top edge to prevent the display panels from sliding down on the support frame. The crossbar of the support frame abuts the nested display panels bottom edge panel's bottom edge to prevent panels from sliding up on the support frame.

U.S. Pat. No. 5,230,176, issued on Jul. 27, 1993 to M. R. Schomaker, describes a temporary sign that is attached to a post and an extending arm (rather than suspended beneath the arm). The sign is attached to a supporting body having a U-shaped cross-section. The bodies are sized to fit around the arm and post, respectively. Flexible members are attached at one end of the body and are led around the arm or post and secured temporarily to the body on an opposite side to secure the body in place.

U.S. Pat. No. 5,937,555, issued on Aug. 17, 1999 to B. L. Query, shows a laminated thermoplastic yard sign that is formed from translucent outer layers that carry the indicia of the sign. An opaque interlayer is located between the translucent outer layers. The opaque interlayer is bonded to the outer sides by lateral seals and bonded to one of the outer layers by a horizontal bottom heat seal. This leaves an opening for insertion of a wire frame. The liner includes an upper flap to provide added strength and rigidity to the upper portion of the sign.

U.S. Pat. No. 7,437,844, issued Oct. 21, 2008 to O. B. Kennedy, provides a wire support frame for a corrugated sign. The wire frame has a transverse bar that is of a greater diameter or thickness than the upper parts of the frame that connect the openings of the corrugated plastic sheet sign.

U.S. Pat. No. 8,677,663, issued on Mar. 25, 2014 to J. D. Tyszko, provides a sign display that includes a mount adapted to be fastened to a vertically-oriented surface and a horizontal support having one end affixed to the mount and extending therefrom in a cantilevered fashion. A first vertical rod is affixed to and extends vertically upwardly from the horizontal support. A second vertical rod is affixed to and extends vertically upwardly from the horizontal support and is laterally disposed from the first vertical rod. A placard having at least one surface is adapted for the display of an advertising message thereon and is affixed to the first and the second vertical rods.

U.S. Pat. No. 9,208,706, issued on Dec. 8, 2015 to S. Baron, teaches a modular lawn sign that is self-supporting once set in the ground. The sign assembly has a base post. The base post has a bottom ground spike and a top free end. An extender post is provided. The extended post slides over the top of the base post. An internal support post is provided. The bottom of the internal support post slides over the top of the extender post. A sign board is provided having a first face panel and a second face panel. The two face panels are joined at a spine panel. A polygonal hole is disposed through the spine panel. The internal support post extends through the hole. The first face panel and the second face panel of the sign board are folded against the internal support post and are secured with fasteners.

U.S. Pat. No. 11,501,666, issued on Nov. 15, 2022 to D. Marston, discloses a system for mounting a sign on a stanchion and a method of using the system for mounting signs. The system includes a bracket that can be mounted onto the upper end of the stanchion and a sign frame that can be mounted onto the bracket. The sign frame supports the sign in an upright position. The bracket has a base with an open lower end that can be lowered down onto the upper end of the stanchion to mount the bracket. The bracket has a support member attached to the base for mounting the sign frame onto the bracket. The support member has a pair of opposing openings that extend through the support member. The sign frame is a pair of frame mounting rods that can be inserted downwardly through the openings to mount the sign frame onto the bracket.

U.S. Patent Application Publication No. 2005/0039363, published on Feb. 24, 2005 to M. Galey, teaches an outdoor display sign having first and second panels carrying indicia thereon. The first and second display panels have a pair of supporting rods passing through the plane of each panel. The support rods extend past the top of the panel so as to afford a location to secure a sleeve to the top of the support rods. The sleeve is located at each end of a restraining rod such that the restraining rod forces the panels into a right angular configuration. The positioning of the panels into a right angle permits viewing of the outdoor display sign from two different directions.

U.S. Patent Application No. Publication 2006/0222822, published Oct. 5, 2006 to D. Bringuet, shows a composite sign panel that includes an inner sheet fabricated from transparent material capable of supporting a predetermined sign display, an outer sheet fabricated from a protective material capable of maintaining the transparency of the inner sheet, and an adhesive for securing the inner sheet to the outer sheet.

U.S. Patent Application Publication No. 2014/0345176, published on Nov. 27, 2014 to Okert et al., provides a modular realty sign post having a first vertical sign section made from extruded vinyl tubing, a second horizontal sign section made from extruded vinyl tubing, and a plurality of clip and bracket combinations for holding a swinging realty sign. The second horizontal sign section intersects and connects with the first vertical sign section. Each of the clips is designed to fit in an aperture in a bottom surface of the second horizontal sign section.

U.S. Patent Application Publication No. 2015/0007471, published in Jan. 8, 2015 to W. B. Cepek, describes a corrugated display apparatus defining a plurality of lower openings and having a plurality of walls at least partially defining a plurality of channels.

Japanese Patent No. 4478131, published on Jun. 9, 2010, discloses a bulletin board. This board has a plate-type body with an air cap sheet and a honeycomb structure interposed between a first surface plate made of a synthetic resin and a dark color rear surface plate. The three surfaces are integrated by welding or adhesives to provide a hollow layer.

Japanese Patent No. 2002052635, published on Feb. 19, 2002 shows a corrugated board structural sheet made of a resin having sufficient light beam barrier properties, along with a container. The structural sheet is formed of a resin having two pieces of a liner part facing each other in parallel and a plurality of ribs that are arranged in parallel between the liner parts so as to connect both liner parts together. Each of the liner parts includes a surface layer and an inner layer part which is formed of a different material from the surface layer part.

Korean Patent No. 100975600, published on Aug. 17, 2010 describes a corrugated cardboard forming method which includes forming a top molding material by mixing a plastic molding material. An adhesive is added to the upper molding material. The upper molding material is foamed and mixed with an additive to form a molten and upper molding material. A plastic molding material is added to form a lower molding material different from the upper molding material. An additive is added to the lower molding material. The molding material is foamed and mixed with the additive to form a molten lower molding material.

It is an object to the present invention to provide a display panel that uses recycled plastic.

It is another object of the present invention to provide a display panel that has an even and smooth surface.

It is another object of the present invention to provide a display panel that has improved print quality.

It is another object of the present invention to provide a display panel that avoids surface imperfections.

It is another object of the present invention to provide a display panel that has an improved visual quality.

It is another object to the present invention to provide a display panel that is more vibrant and legible under direct sunlight.

It is another object of the present invention to provide a display panel that is useful in a wide range of applications.

It is a further object to the present invention to provide a display panel that is versatile in various outdoor settings.

It is another object of the present invention to provide a display panel that is easy to use.

It is a further object of the present invention to provide a display panel that is stable.

It is another object of the present invention to provide a display panel that is environmentally friendly.

It is still a further object of the present invention to provide a display panel that is weather resistant.

These and other objects and advantages of the present invention will become apparent from a reading of the attached specification and appended claims.

SUMMARY OF THE INVENTION

The present invention is a display panel that has an inner layer formed of a plurality of flutes, a first outer layer affixed to one side of the inner layer so as to overlie the plurality of flutes and a second outer layer affixed to an opposite side of the inner layer. The second outer layer overlies the plurality of flutes.

In the present invention, the inner layer and the outer layers are co-extruded together. In particular, the plurality of flutes are of a black color while the outer layers are of a white color. Preferably, the plurality of flutes are formed of recycled polypropylene. Specifically, in the preferred embodiment of the present invention, the plurality of flutes are formed entirely of recycled polypropylene.

Each of the first outer layer and the second outer layer are formed of a plastic resin and a master batch white. The plastic resin is 83% by weight of the total weight of the first outer layer and the second outer layer. The master batch white is 17% by weight of the total weight of the first outer layer and the second outer layer. The master batch white has titanium dioxide therein. Specifically, the titanium dioxide concentration is between 65% and 75% by weight of a total weight of the master batch white as used in the first outer layer and the second outer layer. The aforestated concentrations are merely exemplary of the preferred embodiment of the present invention. Various other concentrations can be used within the scope of the present invention.

Preferably, the inner layer and the outer layers have a density of between 650 and 750 g/m². The plurality of flutes of the inner layer comprise 60% by weight of a total weight of the display panel. The outer layers comprise 40% by weight of the total weight of the display panel.

In an embodiment of the present invention, the first and second outer layers extend outwardly of the plurality of flutes along at least one side of the inner layer. Preferably, the first and second outer layers extend outwardly of the plurality of flutes along opposite sides of the inner layer. The opposite edges of the first and second outer layers are prospectively coplanar and aligned with opposite edges of the plurality of flutes. Each of the plurality of flutes defines a channel extending through the inner layer between the first outer layer and the second outer layer. The channels of the plurality of flutes have longitudinal axes parallel to each other.

A wire frame is affixed to at least one of the inner layer, the first outer layer and the second outer layer. The wire frame extends outwardly of at least one edge of the display panel. In the preferred embodiment of the present invention, the wire frame extends into an interior of at least one of the plurality of flutes. The wire frame specifically includes a first leg, a second leg extending in parallel relation to the first leg, and a cross-member extending between the first leg and the second leg. A portion of the first leg is received by one of the plurality of flutes. The second leg has a portion received in another of the plurality of flutes. The cross-member extends between another portion of the first leg and another portion of the second leg. The cross-member is positioned below and outwardly of the inner layer.

A printing or an indicia is formed on an outer surface of at least one of the first outer layer and the second outer layer.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 2:
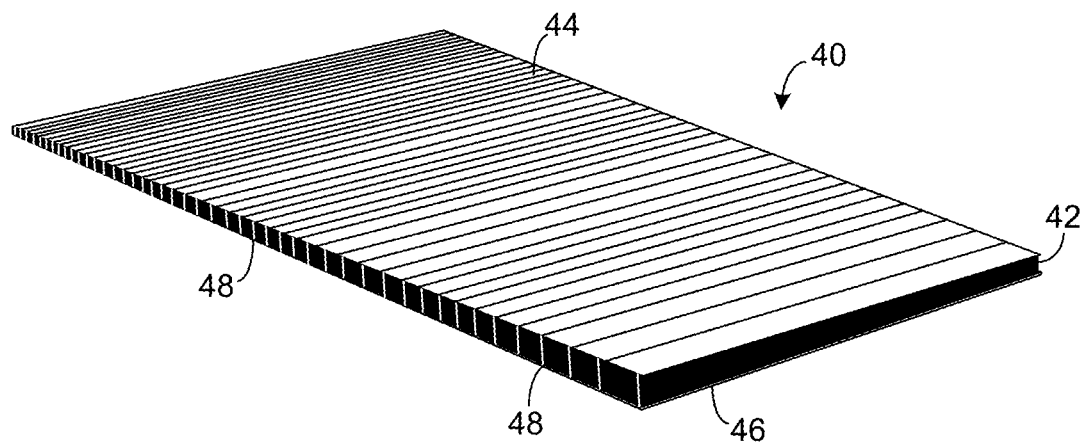
FIG. 2 is an upper perspective view showing the display panel in accordance with the present invention.

Referring to FIG. 2, there is shown the display panel 40 of the present invention. Display panel 40 includes an inner layer 42, a first outer layer 44 and a second outer layer 46. The inner layer 42 is illustrated as having a plurality of flutes 48 formed therein. The first outer layer 44 is affixed to one side of the inner layer 42 so as to overlie the plurality of flutes 48. The second outer layer 46 is affixed to an opposite side of the inner layer 42. The second outer layer 46 overlies the plurality of flutes 48. The inner layer 42, the first outer layer 44 and the second outer layer 46 are co-extruded.

As can be seen in FIG. 2, the plurality of flutes 48 of the inner layer 42 are of a black color. Each of the first outer layer 44 the second outer layer 46 is of a white color. Specifically, the plurality of flutes 48 are formed of recycled polypropylene. In the preferred embodiment of the present invention, the plurality of flutes are formed entirely of recycled polypropylene. As such, the display panel 40 of the present invention is extremely environmentally friendly and relatively inexpensive.

In the present invention, each of the first outer layer 44 and the second outer layer 46 is formed of a plastic resin and a master batch white. The plastic resin is 83% by weight of a total weight of the first outer layer 44 and the second outer layer 46. The master batch white is 17% by weight of the total weight of the first outer layer 44 and the second outer layer 46. The master batch white has titanium dioxide therein. The titanium dioxide concentration is 65% and 75% by weight of the total weight of the master batch white as used in the first outer layer 44 and the second outer layer 46. The display panel 40, as shown in FIG. 2, will have a density of approximately 650-750 g/m².

The plurality of flutes 48 of the inner layer 42 comprise 60% by weight of the total weight of the display panel 40. The first outer layer 44 and the second outer layer 46 comprise 40% by weight of the total weight of the display panel 40.

In the present invention, the first outer surface 44 and the second outer surface 46 are extremely smooth. This is accomplished by the co-extrusion process in which the outer layers 44 and 46 are applied to the inner layer 42. The use of the black colored material for the plurality of flutes 48 of the inner layer 42 provides a "blocking" surface. As such, any indicia or printing that occurs on one of the outer surfaces 44 and 46 will not bleed through to the other of the outer surfaces. In direct sunlight, this will create a more vivid and legible sign. As such, the visual quality associated with the printing on the outer layers 44 and 46 is improved. The display panel 40 can be used in a wide range of applications. The display panel is relatively easy to use, is stable, environmentally is friendly and is weather-resistant.

Figure 3:
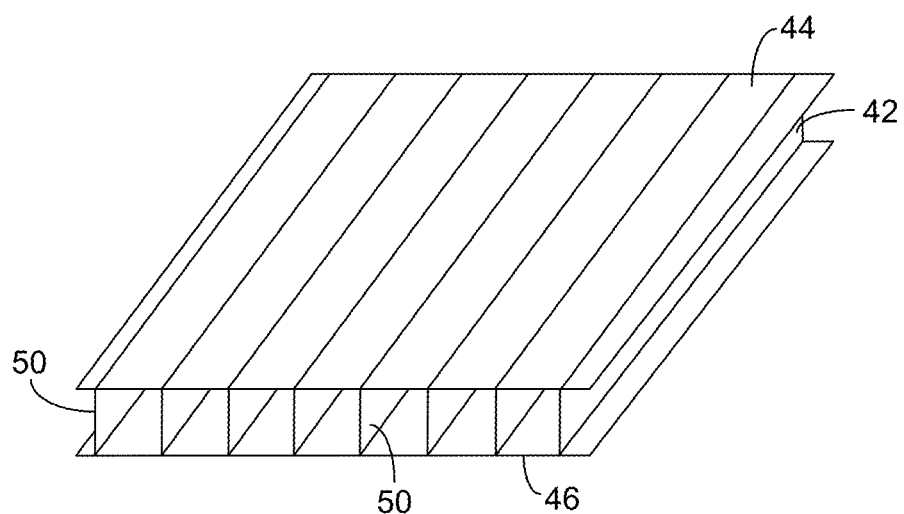
FIG. 3 is an upper perspective view showing the configuration of the display panel of the present invention.

FIG. 3 illustrates the configuration of the first outer surface 44 and the second outer surface 46. Ribs 50 can be co-extruded with the first outer surface 44 and the second outer surface 46 so as to provide further structural stability to the display panel 40 of the present invention. In FIG. 3, it can be seen that the first outer layer 44 and the second outer layer 46 extend outwardly of the middle layer 42 along at least one side of the inner layer 42. In particular, the first outer surface 44 and the second outer surface 46 will also extend outwardly of the opposite side of the inner layer 42. As such, the black-colored flutes in the inner layer 42 are hidden from view from an exterior of the first outer layer 44 and the second outer layer 46.

Figure 4:
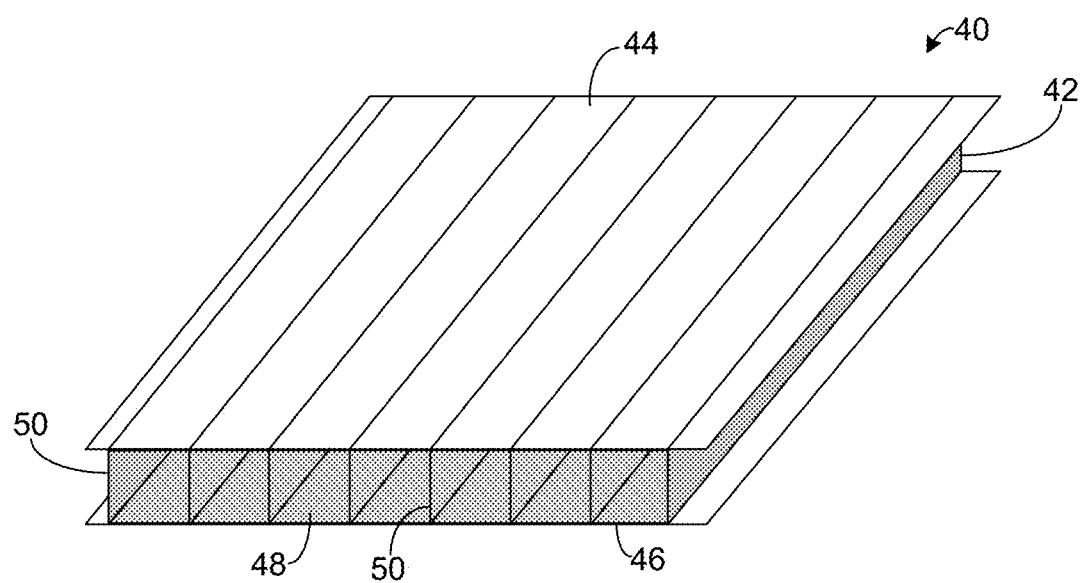
FIG. 4 is a further upper perspective view showing the construction of the first outer layer, the second outer layer and the inner layer of the display panel of the present invention.

FIG. 4 illustrates the display panel 40 as having the plurality of flutes 48 positioned between the first outer surface 44 and the second outer surface 46. It can be seen that the first outer surface 44 is in parallel planar relationship to the second outer surface 46. The plurality of flutes 48 can be formed between the ribs 50 (as shown in FIG. 3). FIG. 4 shows that the plurality of flutes 48 are of a black color so as to block any penetrating sunlight from one side of the display panel 40 to the other side of the display panel 40.

Each of the plurality of flutes 48 will define a channel extending through the inner layer 42 between the first outer layer 44 and the second outer layer 46. The channels of the plurality of flutes 48 will have longitudinal axes in parallel relation to each other.

Figure 5:
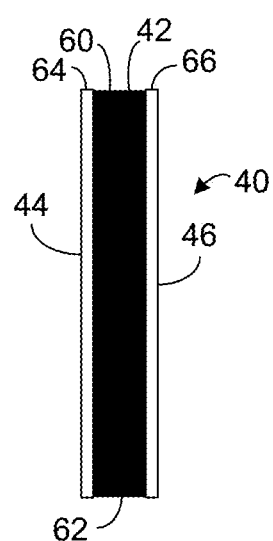
FIG. 5 is an end edge view showing the display panel the present invention.

FIG. 5 is an edge end view of the display panel 40. In FIG. 5, it can be seen that the inner layer 42 has opposite edges 60 and 62 that are generally coplanar with and aligned with opposite edges 64 and 66 of the first outer surface 44 and the second outer surface 46.

Figure 6:
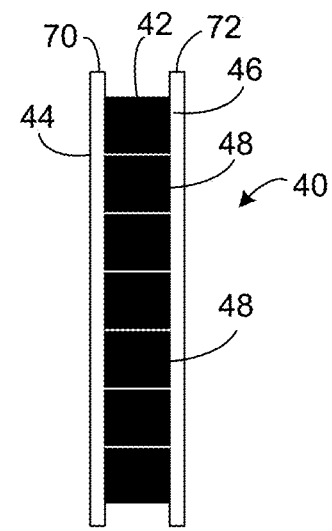
FIG. 6 is a side elevation view of the display panel of the present invention.

FIG. 6 shows that the plurality of flutes 48 are configured between the first outer surface 44 and the second outer surface 46. In FIG. 6, it can be seen that the ends 70 and 72 of the respective outer surfaces 44 and 48 extend outwardly beyond the inner layer 42.

Figure 1:
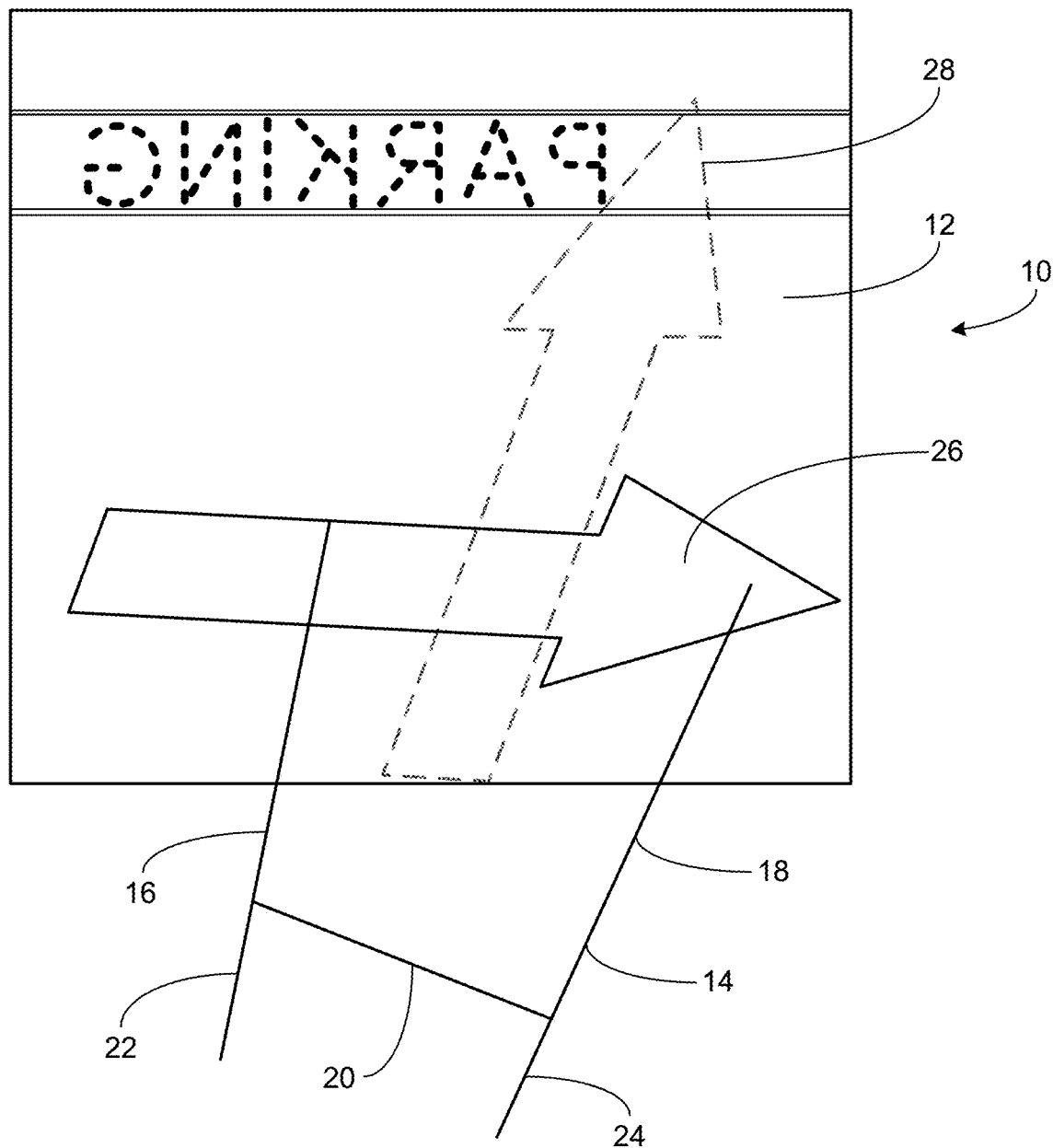
FIG. 1 is an upper perspective view showing a yard sign in accordance with the teachings of the prior art.
Figure 7:
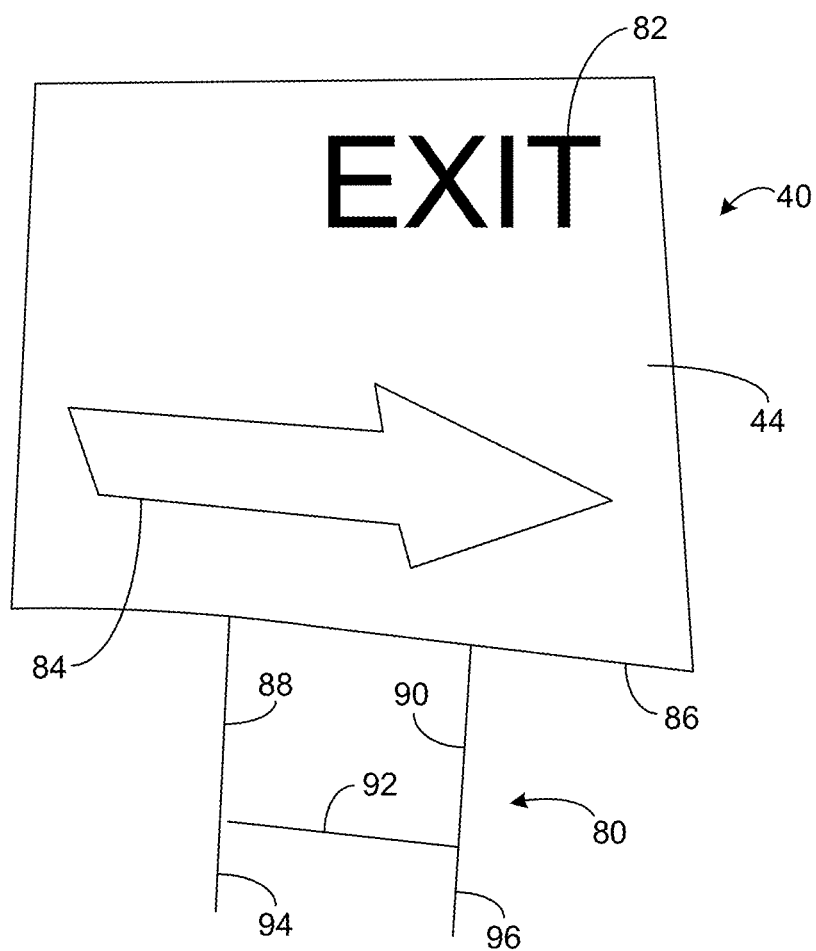
FIG. 7 is a side elevational view showing the display panel of the present invention in actual use.

FIG. 7 shows the display sign 40 of the present invention as affixed to a wire frame 80. The display panel 40 has an outer surface 44 upon which there is a printing 82 of the word "EXIT" and the printing of an arrow 84 thereon. In contrast to the structure shown in FIG. 1, there is no "bleed-through" between the outer surfaces 44 and 46. This is because the opaque black color inner layer 42 blocks any penetration of sunlight therethrough. This black colored layer will not interfere with the viewing of the printings 82 and 84 on the white collar outer surface 44.

The wire frame 80 is affixed to one of the inner layer 42, the first outer layer 44 or the second outer layer 46. The wire frame 80 extends outwardly and downwardly of at least one edge 86 of the display panel 40. In the preferred embodiment of the present invention, the wire frame 80 will include a first leg 88, a second leg 90 and the cross-member 92. A portion of the first leg 88 and a portion of the second leg 90 will extend into the channel of respective flutes of the plurality of flutes 48 of the inner layer 42. Any sort of fixture device can be used so as to fix the first leg 88 and the second leg 90 in its proper position within these flutes. This portion of the first leg 88 and the second leg 90 within the channels of the plurality of flutes will avoid any unsightly appearance that would occur by the adhesive or mechanical fastening of the legs 88 and 90 onto an outer surface of the display panel 40.

The first leg 88 extends in parallel relation to the second leg 90. The cross-member 92 extends between another portion of the first leg 88 and the second leg 90. The cross-member 92 is positioned below the edge 86 of the display panel 40. Ultimately, legs 88 and 90 will have ends 94 and 96, respectively, there are intended to be pushed into the earth or other surface.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

The invention claimed is:

1. A display panel comprising:
   an inner layer formed of a plurality of flutes;
   a first outer layer overlying one side of the plurality of flutes; and
   a second outer layer overlying an opposite side of the plurality of flutes, said inner layer and said first outer layer and said second outer layer being in co-extruded relationship in a sandwiched configuration, the plurality of flutes being of a dark color, each of said first outer layer and said second outer layer being of a color, that is less dark than the dark color of the plurality of flutes.

2. The display panel of claim 1, wherein the plurality of flutes are formed of recycled polypropylene.

3. The display panel of claim 2, wherein the plurality of flutes are formed entirely of recycled polypropylene.

4. The display panel of claim 1, wherein said first and second outer layers extend outwardly of the plurality of flutes along at least one side of said inner layer.

5. The display panel of claim 4, wherein said first outer layer and said second outer layer extend outwardly of the plurality of flutes along opposite sides of said inner layer.

6. The display panel of claim 5, wherein opposite edges of said first and second outer layers are respectively coplanar and aligned with opposite edges of said plurality of flutes.

7. The display panel of claim 1, wherein each of the plurality of flutes defines a channel extending through said inner layer between said first outer layer and said second outer layer.

8. The display panel of claim 7, wherein the channels of the plurality of flutes have longitudinal axes parallel to each other.

9. The display panel of claim 1, further comprising:
   a wire frame affixed to one of said inner layer and said first outer layer and said second outer layer, said wire frame extending outwardly of at least one edge of the display panel.

10. The display panel of claim 9, wherein said wire frame extends into an interior of at least one of said plurality of flutes.

11. The display panel of claim 10, wherein said wire frame comprises:
   a first leg;
   a second leg extending in parallel relation to said first leg, wherein a portion of said first leg is received in one of the plurality of flutes, the second leg having a portion received in another of the plurality of flutes; and
   a cross-member extending between another portion of said first leg and another portion of said second leg, said cross-member positioned below and outwardly of said inner layer.

12. The display panel of claim 1, further comprising:
   a printing or indicia formed on an outer surface of at least one of said first outer layer and said second outer layer.

13. A display panel comprising:
   an inner layer formed of a plurality of flutes;
   a first outer layer overlying one side of the plurality of flutes;
   a second outer layer overlying an opposite side of plurality of flutes, said inner layer and said first outer layer and said second outer layer being in co-extruded relationship in a sandwiched configuration, the plurality of flutes being of a dark color, each of said first outer layer and said second outer layer being of a color that is less dark than the dark color of the plurality of flutes, wherein each of said first outer layer and said second outer layer are formed of a plastic resin and a master batch white, the plastic resin being 83% by weight of a total weight of said first outer layer and said second outer layer, the masterbatch white being 17% by weight of a total weight of said first outer layer and said second outer layer, the masterbatch white having titanium dioxide therein, the titanium dioxide concentration being 65% to 75% by weight of a total weight of the materbatch white as used in said first outer layer and said second outer layer, said inner layer and said first outer layer and said second outer layer having a density of between 650 g/m$^2$ and 750 g/m$^2$, wherein the plurality of flutes of said inner layer is 60% by weight of a total weight of the display panel, said first outer layer and said second outer layer being 40% by weight of the total weight of the display panel.

* * * * *